(No Model.)
G. W. MARBLE.
BICYCLE.
No. 316,047. Patented Apr. 21, 1885.
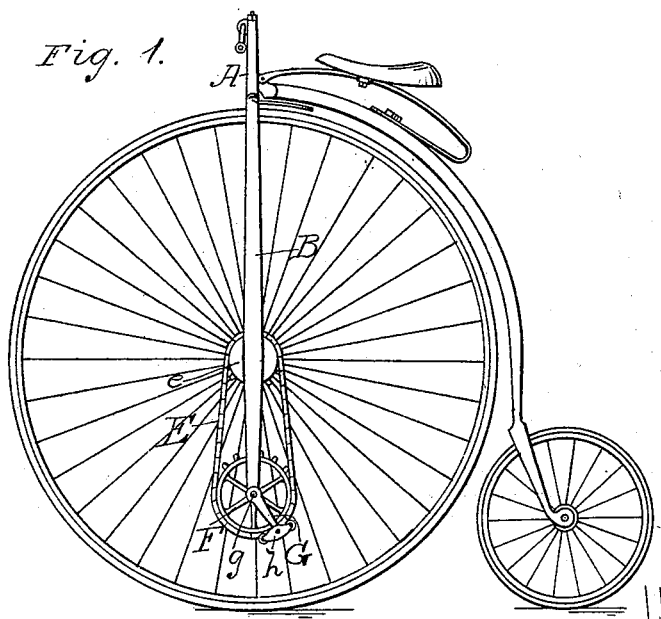
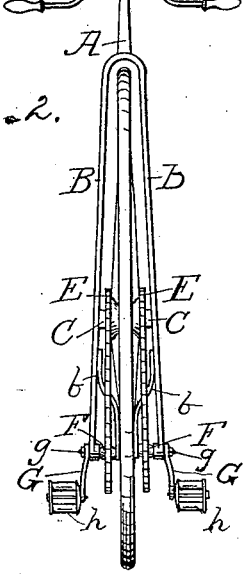
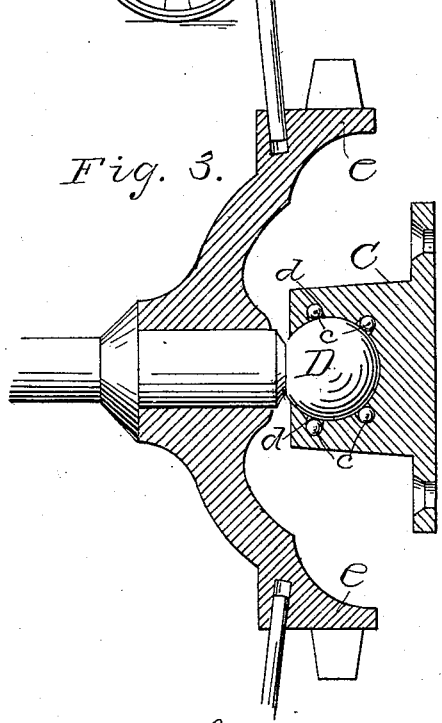
WITNESSES:
E. W. Schirach
H. Hackendorff.
George W. Marble
INVENTOR
BY James N. Coyne
ATTORNEY

UNITED STATES PATENT OFFICE.

GEORGE W. MARBLE, OF CHICAGO, ILLINOIS.

BICYCLE.

SPECIFICATION forming part of Letters Patent No. 316,047, dated April 21, 1885.

Application filed August 30, 1884. (No model.)

*To all whom it may concern:*

Be it known that I, GEORGE W. MARBLE, of Chicago, in the county of Cook and State of Illinois, have invented certain new and useful Improvements in Bicycles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide a bicycle which is not liable to take "headers," which, should the rider have a fall, would be less liable to injure him, and which, although the drive-wheel is of less diameter, can be run as fast, without extra exertion, as a bicycle having a drive-wheel of much greater diameter. This I accomplish by extending the legs of the fork below the bearings of the drive-wheel and journaling in the lower extremities of these legs sprocket-wheels, which are driven by treadles secured to the outer ends of their journals by a link-chain belt passing over small sprockets attached to or made integral with the hub of said drive-wheel.

In the drawings, Figure 1 is a side elevation of my improved bicycle. Fig. 2 is a front end view of the same, and Fig. 3 is a detail view thereof.

Reference being had to the drawings, it will be observed that the general design of my bicycle is the same as the majority of those in current use. It has a large drive-wheel, a small follower, and a backbone connecting the two, which is oscillatingly-connected to the fork, which latter has its legs extend vertically downward past the bearings of the drive-wheel and have their lower ends bifurcated, as will hereinafter be more fully explained.

At that point where the bearings of the drive-wheel would strike the legs B of the fork A, I provide a bearing-box, C, the pillow and block of which correspond in essential features of construction, and have screw-plates, by means of which they are secured in position to the inner vertical surfaces of the legs B. When the pillow and block are brazed or otherwise secured together, they form a bearing-chamber which is the reverse of the circumference of the spherical journal D on the ends of the axle of said drive-wheel, as shown. The advantage to be derived from this construction is that it holds the legs B in position at that point, and that it affords a ball-bearing, the operation of which would not be affected by the accidental bending or contortion of said legs. If desired, however, there may be made in the circumferential surfaces of the bearing-chamber grooves or pockets $d$, in which may be placed friction-balls $c\ c$, thus materially reducing the friction between the bearing-surface and the journal.

Fast on the axle of the drive-wheel, between the journals D and the spokes, are the sprocket-wheels $e\ e$, which are driven through the medium of a link-chain belt, E, by the sprockets F F, fast on the pedal-shafts $g\ g$, which latter are journaled in the extremities of the bifurcated ends $b\ b$ of the legs B of the fork. The bifurcated ends $b\ b$ of legs B are sufficiently removed from the drive-wheel to prevent interference therewith.

On the outer ends of shafts $g\ g$ are secured the cranks G, having secured thereto, in the usual manner, the pedals $h\ h$, by means of which the machine is operated.

The stretch from the rider's seat on the backbone to the pedals $h$ in my machine is made to correspond to the reach of a machine the diameter of whose drive-wheel is much greater. Thus the height of the machine is greatly lessened, and should the rider take a header he would have less distance to travel.

It will also be observed that there is less likelihood of the rider performing such a feat, because the weight and pressure of the rider's feet are much below the fulcrumal point of the fork.

In order to avoid the objection that my improved bicycle having a wheel of smaller diameter could not travel as fast as one of the larger machines, I make the lower sprocket, F F, on the pedal-shafts of a greater diameter than the sprockets $e\ e$ on the drive-wheel axle. Thus with one revolution of the pedals the drive-wheel may perform one and a fraction of a revolution, or even two revolutions, if desired.

Various changes of minor importance may be introduced in the construction of my machine without constituting a departure from the spirit of my invention—e. g., the pillow and block of the bearings of the drive-wheel may be fastened in position by clamping them to the legs; or gears or their equivalents may be used to take the place of the sprockets and drive-chain; or, instead of bifurcating the legs of the fork, a brace or bracket may be used instead, which, together with said leg, would afford a sufficient journal for the sprocket E.

What I claim as new, and desire to secure by Letters Patent, is—

1. The combination, in a bicycle with a fork the legs of which extend below the bearings of the drive-wheel, and said bearings having a spherical bearing-chamber, of the drive-wheel, the journals of the axles of which are spherical and correspond to the said bearing-chamber, as hereinbefore set forth.

2. The combination, in a bicycle, of a fork the legs of which extend below the bearings of the drive-wheel, the said bearings suitably connected to the inner surface of said legs, consisting of a pillow and cap, which, when secured together, form a spherical bearing-chamber, in the inner annular surface of which are circumferential grooves or pockets, and friction-balls adapted to independently revolve in said grooves or pockets, with a drive-wheel the journals of the axles of which are spherical and adapted to fit the spherical chamber of said bearings.

3. The combination, with the drive-wheel, the forks having legs which extend in a line below the bearings of the drive-wheel, said bearings connected to the inner side of said legs and in alignment therewith, the rear wheel, and a backbone connected, as set forth, to the said fork, of the pedals journaled in the extremities of said legs, and means for imparting their motion to the drive-wheel.

In testimony that I claim the foregoing as my own I hereunto affix my signature in presence of two witnesses.

GEORGE W. MARBLE.

Witnesses:
JAMES H. COYNE,
FRANK D. THOMASON.